United States Patent [19]

Krawiec

[11] Patent Number: 4,725,402

[45] Date of Patent: Feb. 16, 1988

[54] WELDED NUCLEAR FUEL GRID AND METHOD

[75] Inventor: Donald M. Krawiec, Enfield, Conn.

[73] Assignee: Combustion Engineering, Inc., Windsor, Conn.

[21] Appl. No.: 856,888

[22] Filed: Apr. 28, 1986

[51] Int. Cl.$^4$ .............................................. G21C 3/34
[52] U.S. Cl. .................................... 376/438; 376/448
[58] Field of Search ................ 376/438, 448; 165/162; 211/14

[56] References Cited

U.S. PATENT DOCUMENTS

| | | | |
|---|---|---|---|
| 3,423,287 | 1/1969 | Anthony | 165/162 |
| 4,090,918 | 5/1978 | Masetti | 165/162 |
| 4,359,088 | 11/1982 | Jabsen | 165/162 |
| 4,492,844 | 1/1985 | Kobuck | 376/442 |

Primary Examiner—Donald P. Walsh
Attorney, Agent, or Firm—John H. Mulholland

[57] ABSTRACT

A fuel rod support grid having a quadrangular perimeter and fuel rod compartments defined by slottedly interlocking grid-forming members with openings in register intermediate the lines of intersection of the grid-forming members to provide accessible exposed edges for small nugget welds. The edge of one of two adjacent openings in register may define a weld enhancing tab. Typically, the pairs of openings in register and their small nugget weld are at two locations intermediate the line of intersection of two grid-forming members.

8 Claims, 5 Drawing Figures

WELDED NUCLEAR FUEL GRID AND METHOD

FIELD OF THE INVENTION

The present invention relates to nuclear reactors and more particularly to means for spacing and supporting fuel elements in bundles or assemblies in the reactor by means of a welded fuel element support grid.

BACKGROUND OF THE INVENTION

Fuel assemblies for nuclear reactors are generally provided in the form of fuel elements or rod arrays maintained by a structure including welded spacer grids, a lower end fitting, and an upper end fitting. Guide tubes provide the structural integrity between the lower end fitting, the upper end fitting and the grid spacers intermediate the ends. The grid spacers define an array of fuel rods which typically may be rows and columns of 16 rods each. One such support grid is disclosed in U.S. Pat. No. 3,423,287.

The typical fuel element support grid for supporting an array of nuclear fuel elements or rods intermediate their ends includes a generally quadrangular perimeter. A plurality of fuel element compartments within the perimeter are defined by first and second slottedly interlocked grid-forming members welded to the perimeter and joined to each other by small nugget welds at the ends of their lines of intersection.

The grid-forming members of the fuel element support grid are each slotted for one-half of their width along their lines of intersection with the other grid-forming members of the array such that they may be assembled and interlocked at the lines of intersection in what may be termed "egg-crate" fashion. This structure has been utilized in that it provides a good strength to weight ratio without severely affecting the flow of cooling or moderating fluids through the grid in the nuclear reactor. The grid-forming members typically include projecting springs and arches for engaging and supporting the fuel elements within the compartments. At each fuel rod grid position in the fuel assembly, axial, lateral and rotational restraint is provided against fuel rod motion during operation with fuel coolant flow or during seismic disturbance or external impact. These spacer grids also act as lateral guides during insertion and withdrawl of the fuel assembly from the reactor. All of the elements of the fuel lattice, including the leaf springs and the arches within the compartments, are parallel to the fuel coolant flow to minimize pressure drop across the grid.

SUMMARY OF THE INVENTION

In a fuel element support grid constructed according to the invention, a plurality of openings in the grid-forming members interrupt their lines of intersection to provide accessible exposed adjacent edges of each member of an intersecting pair of grid-forming members intermediate the length of their line of intersection. The openings expose and make accessible edges of the pair so that small nugget welds can be provided along the length of the lines of intersection instead of merely at the ends, as has heretofore been the case. Preferably, the openings are provided in each member of a pair of intersecting grid-forming members the same distance from the ends of their line of intersection so that they are at least partially in register.

One of each of two adjacent openings in register has a weld-enhancing tab exposed by the opening in the other grid-forming member of the pair. The tab of each grid-member of the two intersecting grid members is in an opening in the unslotted portion of the line of intersection and the other opening of each grid member intersects the slot of that grid member.

Smaller sized nugget welds located along the intermediate portions of the slots significantly increase the crush strength capability of the grid and are made possible because of the particular tab and opening structure of the invention. A small nugget weld can be provided, for instance, by laser welding because the openings provide a clear and free path for performance of the laser welding operation. The small nugget weld size also maintains a low pressure drop during fluid flow across the grid.

DETAILED DESCRIPTION OF THE PREFERRED EMBODIMENT

Figure 1:
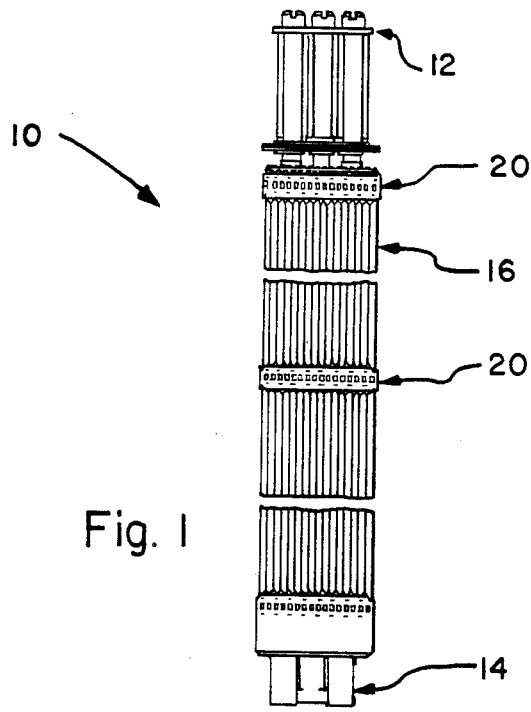
FIG. 1 is a schematic front elevational view of a typical fuel assembly.

The number 10 generally designates a fuel assembly for use in a nuclear reactor. The fuel assembly 10 includes: an upper end fitting, generally designated by the numeral 12; a lower end fitting, generally designated by the numeral 14; fuel rods or elements, generally designated by the numeral 16; and, fuel element spacer or support grids, generally designated by the numeral 20.

Figure 2:
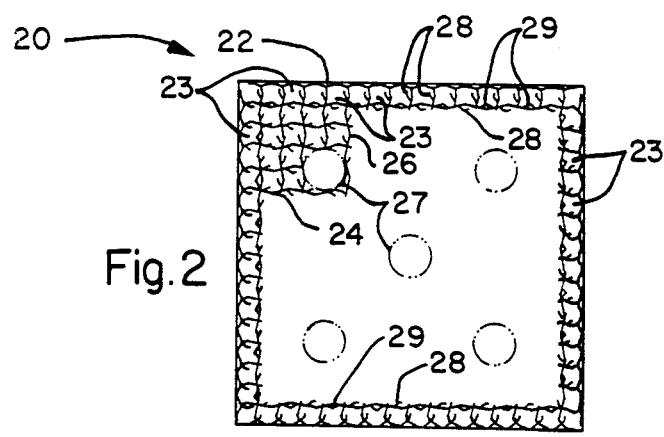
FIG. 2 is a partial plan view of a fuel assembly grid.
Figure 3:
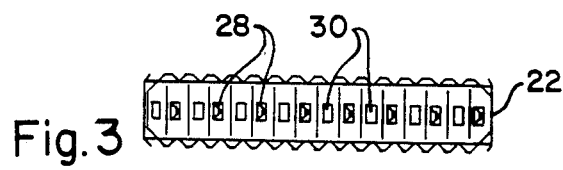
FIG. 3 is a front elevational view of the fuel assembly grid of FIG. 2.

The fuel assembly support grid 20 typically is of all zircaloy construction and has a quadrangular perimeter 22 which surrounds a plurality of fuel element compartments 23 defined by grid-forming members 24 and 26. The grid 20 is supported by guide tubes 27, shown in phantom lines in FIG. 2. The grid-forming members 24 and 26 and the perimeter member 22 have appropriate springs 28 and arches 29 for restraining and supporting the fuel elements or rods 16 within the compartments 23. The perimeter member 22 has fluid flow openings 30, as do the grid-forming members 24 and 26 (not shown).

Figure 4:
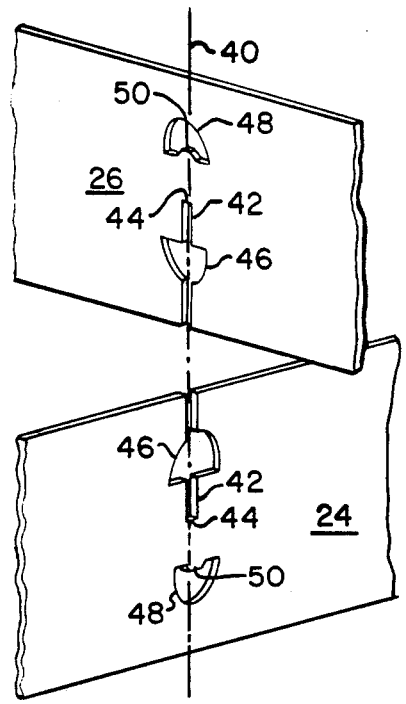
FIG. 4 is a fragmentary exploded perspective view of an intersection of two grid forming members of a fuel assembly grid according to the principals of the invention.
Figure 5:
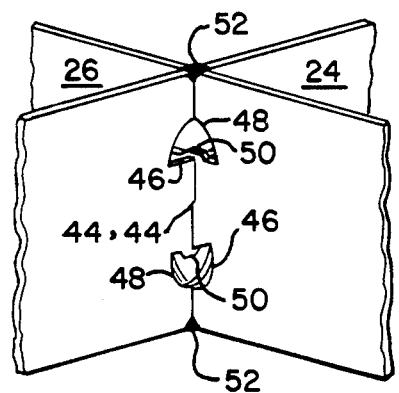
FIG. 5 is a fragmentary assembled perspective view of the grid forming members of FIG. 4 in assembled and welded condition.

Grid forming members 24 and 26 meet at a plurality of lines of intersection 40 where they are slottedly interlocked to form the grid. The interlocking slots 42 lie along the intersection lines 40 and extend to a mid point of the width of the grid-forming members 24 and 26, as can be seen in the exploded view of FIG. 4. In the FIG. 5 assembled view, it will be seen that the base 44 of each slot 42 is brought into engagement with the base of 44 of the slot 42 of the other of the pair of intersecting grid-forming members 24 and 26.

At the approximate mid point of the slots 42, an opening 46 is provided. At the approximate mid-point along the line of intersection 40 of the unslotted portion of the grid-forming members 24 and 26, an opening 48 is provided. The opening 48 has a tab 50 defined by its edge at the line of intersection 40. Tab 50 enhances a laser weld operation to join grid-members 24 and 26 at that intermediate point on the line of intersection 40.

The openings 46 and 48 provide accessible exposed adjacent edges of the first and second grid forming members 24 and 26 such that laser access to the tab 50 makes for a simple small nugget weld providing welding operation. This welding operation heretofore has not been performed because of the inaccessibility of the intermediate portions of the lines of intersection 40. Accordingly, only welds 52 at the respective ends of the lines of intersection 40 between the grid forming members 24 and 26 have been provided heretofore.

The problem of accessibility has been solved by the openings 46 and 48 and small nugget welds intermediate the lines of intersection provide improved strength without increasing the problem of pressure drop of fluid flowing through the grid which would otherwise be created by projections of weld material along the line of intersection 40. It will be seen that the tabs 50, which form the small nugget welds in these intermediate structural positions, are easily fused through openings 46 and 48, thereby providing a significant increase in grid strength without a significant increase in pressure drop of fluid flowing across the grid.

I claim:

1. In the fuel element support grid for supporting a plurality of nuclear fuel elements intermediate their ends, said grid including a generally quadrangular perimeter and a plurality of fuel element compartments defined by first and second slottedly interlocked grid-forming members attached to said perimeter and joined to each other by small nugget welds at the ends of their lines of intersection, the improvement comprising:

a plurality of openings in said grid-forming members interrupting at least some of said lines of intersection to provide accessible exposed adjacent edges of said first and second grid-forming members at points on said lines of intersection, and welds intermediate the length of said lines of intersection in said openings on said accessible exposed edges, whereby a significant increase in grid strength is obtained without creating a significant pressure drop of fluid flowing across the grid.

2. The support grid of claim 1 in which the openings are provided in each of a pair of intersecting grid-forming members.

3. The support grid of claim 2 in which the openings of each of the pair of grid-forming members are the same distance from the ends of their line of intersection and are at least partially in register.

4. The support grid of claim 1 in which the edges of at least some of the openings define weld enhancing tabs.

5. The support grid of claim 2 in which each of said grid forming members has two openings along the line of intersection and each opening is in partial register with an opening in the other grid-member of the pair.

6. The support grid of claim 5 in which one opening of each two openings partially in register has a tab.

7. The support grid of claim 6 in which each grid-forming member of the pair of grid-forming members has one tab exposed by an opening in the other grid-forming member of the pair in partial register with the opening having a tab.

8. The support grid of claim 7 in which the tab of each grid-member is in an opening of the unslotted portion of the line of intersection and the other opening of each grid-member intersects the slot of said grid-member.

* * * * *